(12) United States Patent
Vontell

(10) Patent No.: US 7,968,829 B2
(45) Date of Patent: Jun. 28, 2011

(54) ELECTRICAL CONNECTION FOR TITANIUM METAL HEATER IN JET TURBINE APPLICATIONS

(75) Inventor: John H Vontell, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 977 days.

(21) Appl. No.: 11/647,420

(22) Filed: Dec. 28, 2006

(65) Prior Publication Data

US 2008/0156790 A1    Jul. 3, 2008

(51) Int. Cl.
*H05B 1/02* (2006.01)
(52) U.S. Cl. ......... 219/507; 219/541; 219/542; 219/494
(58) Field of Classification Search .................. 219/494, 219/505–508, 540–543
See application file for complete search history.

(56) References Cited

U.S. PATENT DOCUMENTS

| | | | | |
|---|---|---|---|---|
| 6,941,064 B2 * | 9/2005 | Thweatt, Jr. | ................. | 392/488 |
| 7,702,224 B2 * | 4/2010 | Elnar | ............................ | 392/466 |

FOREIGN PATENT DOCUMENTS

| | | |
|---|---|---|
| EP | 1593595 | 11/2005 |
| EP | 1657964 | 5/2006 |
| JP | 0545911 | 6/1993 |
| JP | 2005517579 | 6/2005 |
| JP | 2005276792 | 10/2005 |
| WO | 03069955 | 8/2003 |
| WO | 2005124929 | 12/2005 |

OTHER PUBLICATIONS

European Search Report dated Jan. 28, 2010.

* cited by examiner

*Primary Examiner* — Mark H Paschall
(74) *Attorney, Agent, or Firm* — Carlson, Gaskey & Olds, PC

(57) ABSTRACT

An electrical connection for a heater for aerospace components having a titanium containing heater element; a copper containing conductor; and a welded or strong mechanical interface transition connecting the titanium containing heater element and the copper containing conduction transition. The transition has a titanium containing component and a copper containing component, where the titanium containing component is joined to the titanium containing heater element. A heater connection for a surface mounted heater for a jet turbine application having a titanium containing heater element, a copper containing conduction transition, and a weld transition connecting the heater element and the copper containing conduction transition. The weld transition has a titanium containing weld.

23 Claims, 2 Drawing Sheets

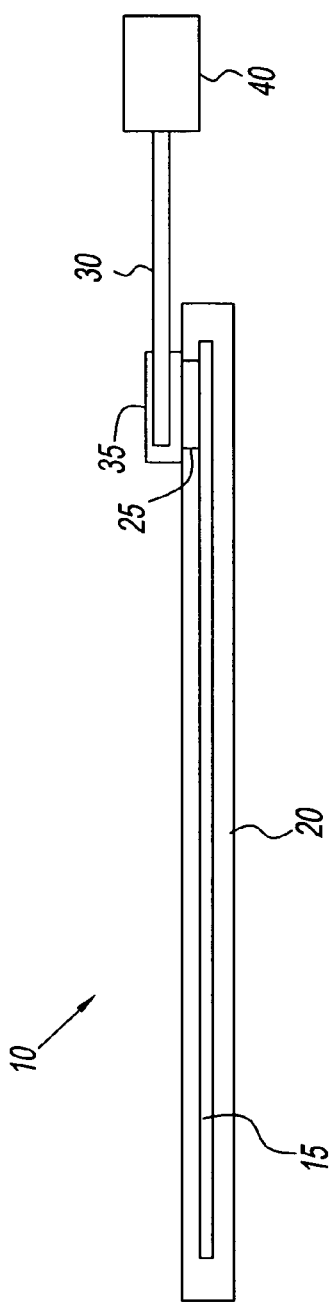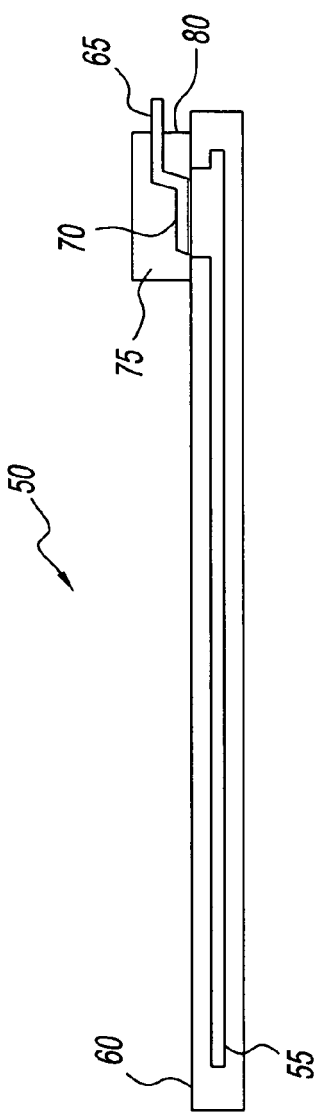

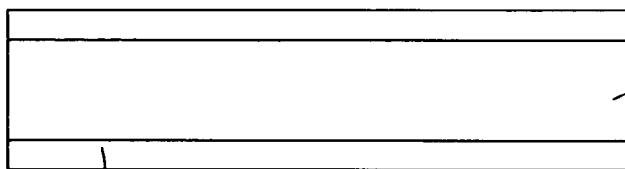
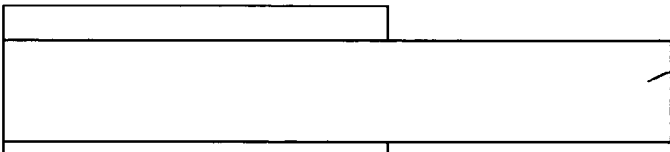
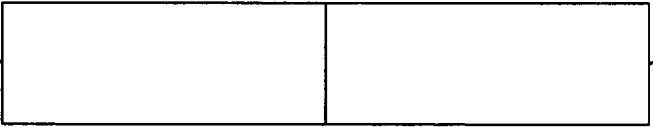
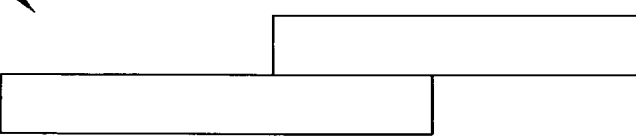

ELECTRICAL CONNECTION FOR TITANIUM METAL HEATER IN JET TURBINE APPLICATIONS

STATEMENT REGARDING FEDERALLY SPONSORED RESEARCH OR DEVELOPMENT

This invention was made with Government support under Contract No. N00019-02-3003. The Government has certain rights in this invention.

BACKGROUND OF THE INVENTION

1. Field of the Invention

The present invention is related to a connector system that permits a titanium heater element to be welded to a titanium conductor transition for use in gas turbine applications. More specifically, the present invention is related to a connector system that permits a titanium heater element to be welded to a titanium conductor transition for use in gas turbine applications that is then connected to a copper conductor thus allowing conventional joining techniques.

2. Description of Related Art

The operating environment of aerospace components is extremely harsh. This is particularly so for the many fragile electrical connections that must be maintained for proper function. Conventionally, the electrical connections to the aircraft are achieved by soldering conventional copper electric wire, metal pins or metal tabs to heater pad areas using typical tin-lead electronic solders. These connections can be achieved either prior to or after the heater substrate bonding operations. The exiting copper conductor wires are generally routed to an electrical connector, which is fabricated separately. The soldered joint is then sealed by encapsulation with a polymer to eliminate the environmental effects and provide strain relief.

While this technique is understood and useful for copper and nickel resistive alloys, other applications benefit from the attachment of copper conductors to titanium resistive alloys in gas turbine engines. One such application is the use of surface mounted titanium metal foil heaters in gas turbine applications. Soldering the titanium foil and copper wire with tin-lead solders requires the titanium metal foil to be plated either electrolytically or electro-less with copper or nickel. These processes add cost, contamination sources for bonding to the encapsulation compound and potential site for solder joint failure. These and other disadvantages also exist, when using titanium, copper and tin-lead in a high temperature environment.

Accordingly, there is a need for a connector to connect the titanium foil of a turbine component to a titanium weld conductor for connection to a copper conductor which allows conventional soldering techniques.

SUMMARY OF THE INVENTION

The present disclosure provides a titanium containing foil heater that is welded to titanium to produce a strong interface uncontaminated by chemical metal plating processes or use of fluxes.

The present disclosure provides an electrical connection for a titanium containing foil heater having a titanium containing welded connection to a copper containing conductor such as a connector pin or a termination, which allows conventional soldering techniques.

The present disclosure further provides for the use a titanium containing foil heater elements for aerospace applications, resulting in reduced weight, cost and increased performance.

The present disclosure yet further provides for the elimination thermal damage to any adjacent heat sensitive materials such as polyimide films used in the heater fabrication, caused by the welding process.

The present disclosure also provides a connection for a titanium containing foil heater, a titanium containing weld connection and a copper containing conductor that is encapsulated with sufficient bond strength to form a strong and durable environmental seal that also offers strain relief.

The present disclosure further provides a titanium containing weld for a titanium containing foil heater element that is capable of operating under conditions exceeding 300° F.

These and other advantages and benefits of the present disclosure are provided by an electrical connection for a heater for aerospace components having a titanium containing heater element; a copper containing conduction transition for connection to an electrical connector; and a welded or strong mechanical transition connecting the titanium containing alloy heater element and the copper containing conduction transition. The transition has a titanium containing component and a copper containing component, where the titanium containing component is welded to the titanium containing heater element.

A heater connection for a gas turbine application having a titanium containing heater element, a copper containing conduction transition for connection to a power source, and a weld or strong mechanical transition connecting heater element and the conduction transition. The transition has a titanium containing to copper containing interface.

BRIEF DESCRIPTION OF THE DRAWINGS

The forgoing and other advantages and benefits of the present disclosure will be more apparent from the following detailed description of the preferred embodiment of the present disclosure in connection with the accompanying drawings.

FIG. 1 illustrates a conventional gas turbine heater construction using a copper heater element, a tin-lead solder and copper conductor wires;

FIG. 2 illustrates a heater using a titanium containing foil heater welded to a copper containing conductor transition using a titanium containing weld, according to the present disclosure;

FIG. 3 illustrates a first configuration of the titanium containing foil heater and copper containing conductor weld transition in an extruded state;

FIG. 4 illustrates a first configuration of the titanium containing foil heater and copper containing conductor weld transition, according to the present disclosure;

FIG. 5 illustrates a second configuration of the titanium containing foil heater and copper containing conductor weld according to the present disclosure; and FIG. 6 illustrates a third configuration of the titanium containing foil heater and copper containing conductor weld transition according to the present disclosure.

DETAILED DESCRIPTION OF THE INVENTION

Referring to the drawings and in particular to FIG. 1, a conventional heater configuration for aerospace composites is shown, generally referred to by reference numeral 10. Conventional heater 10 has a copper heater element 15 encapsulated in an electrical insulator body 20. Solder joint 25 connects electrical copper conductor 30 to copper heater element 15. Electrical copper conductor 30 (metal pins or metal tabs) is connected to an electrical connector 40 for connection to the aircraft in the convention manner. Electrical copper conductor 30 is protected by polymeric encapsulant 35.

While the conventional heater configuration is suitable for either embedded or secondarily bonded to the outer surface of epoxy fiber reinforced composite aerospace composite structures, solder joint 25 configuration cannot be reliably used with a titanium foil heater or withstand operating temperatures at above 300° F.

Such a configuration that bonds a titanium heater foil element to a copper wire with tin lead solders presents numerous obstacles and problems. Soldering the titanium foil and copper wire with tin-lead solders requires that the titanium foil heater be plated either elecrolytically or electro-less with copper or nickel. These processes add cost, contamination sources for bonding to the encapsulation compound and potential site for joint failure. Further, brazing or welding resulting in the fusion of the copper and titanium result in brittle intermetallic phases with poor corrosion resistance and low mechanical strength. These intermetallic phases can result in joint failure during service.

Furthermore, shielding gases such as argon, a vacuum environment or chemical fluxes are required to eliminate oxygen contamination of the joint. The complex connection site contains multiple metals and resultant alloys which may require unique preparation techniques to achieve a strong durable bond to the encapsultion compound.

Referring to FIG. 2, a titanium containing heater generally represented by reference number 50, is shown. Heater 50 has a titanium foil heater element 55. Heater element 55 is protected by heater electrical insulator 60. One end of titanium foil heater element 55 is raised to form heater pad 63, to permit easier welding. Heater element 55 is connected to copper conductor transition 65 (illustrated as a pin) by welded titanium conductor transition 70. A molded polymer encapsulant 75 covers and protects junction 80 including copper conductor transition 65, titanium containing heater element 55 and welded titanium conductor transition 70. It should be noted that the titanium and copper components of the present invention can also be titanium alloys and copper alloys, respectively.

Titanium heater element 55, instead of a copper heater element 15 of the conventional embodiment, creates a stronger interface between heater element 55 and titanium weld joint 70. Ordinarily, additional costly plating processes of the titanium foil heater with copper or nickel would be required with copper wire and tin-lead solders. Further, the use of titanium heater element 55 and titanium weld joint 70 proximate the copper conductor permits higher operating temperatures because the metals are all capable of withstanding and functioning at temperatures exceeding 300° F. Using low melting point temperature metals such as tin, lead and silver can potentially result in alloying with the turbine blades and eventual degradation of the turbine.

By using the titanium heater foil 55 and titanium weld joint 70, low temperature welding techniques such as micro-resistance welding can be used which do not damage the protective polymeric compounds of electrical insulator body 20 and molded polymer encapsulant 75. Alternatively, electrical insulator body 20 and/or molded polymer encapsulant 75 are formed and cured directly onto the surface of heater foil 55 and titanium weld join 70 because they can be fabricated at temperatures and pressures that would not damage those joints In contrast, traditional encapsulants such as thermoplastics require temperatures and/or pressures which would damage conventional joints and conductors.

Referring to FIG. 3, wire 90 is shown that is fabricated from a copper rod 95 that is jacketed with titanium sleeve 100, such as available from Anomet Products Inc. although other suppliers could be used. Wire 90 is generally formed by drawing the copper material and the titanium material through a die resulting in a strong mechanical interface. Wire 90 forms a first configuration of weld transition of FIG. 4, generally referred to with reference numeral 110. Transition region 110 has been shaped by chemically milling to expose copper core 115, at side of transition region 110 that will connect to either a conductor or form a pin. Copper core 115 can be shaped to accommodate the interface to the copper conductors. Alternatively, copper core 115 can be coined for a flat end for soldering or a pin integrated into an electrical connector.

In a sense, this connection could be summarized as the mechanical interface transition including one of the titanium containing component and the copper containing component being a wire and the other jacketing the wire.

If desirable, exposed copper core 115 can than be plated with metals and procedures in common use by the electronics industry for electrical contacts before attachment to the heater foil 55 of FIG. 2. At the opposite side of transition region 110, titanium jacket 120 having copper core 115 is treated using a technique such as coining to yield a flat shape for welding to titanium foil heater pad 63 titanium heater foil element. This shaped end is micro-resistance welded to the titanium heater element 55 to achieve the connection. The micro resistance weld only melts the titanium-to-titanium interface eliminating any intermetallic phases that would result with titanium-copper metals.

Referring to FIG. 5, a second configuration for a welded titanium transition region is shown, and generally represented by reference numeral 130. Transition region 130 is fabricated from a copper rod 140 which has been inertia or friction welded to a titanium rod 135 such as provided by Interface Welding Inc, although other suppliers could be used. The resulting transition region 130 can be shaped in a similar fashion as the configuration of FIG. 4. Titanium rod 135 can be shaped to nest with the heater connection proximate titanium foil heater element 55 using a technique such as coining yielding a flat shape. This shaped end is micro resistance welded to the titanium heater pad 63 to achieve the connection. The micro resistance weld only melts the titanium-to-titanium interface eliminating any intermetallic phases.

Similarly, copper rod 140 of transition region 130 or wire is shaped to accommodate the interface to the copper conductors 65. This can be an interface such as a coined flat end for soldering or a pin integrated into an electrical connector. If desirable, the exposed copper core can than be plated with metals and procedures in common use by the electronics industry for electrical contacts before attachment to the heater foil.

The above embodiment could be summarized as the mechanical interface transition including the copper containing component and the titanium containing component are both rods, and are welded to each other at one end of each of said rods.

Referring to FIG. 6, a third configuration for a titanium transition region 150 is shown. Transition region 150 is fabricated from a copper preform 155 with a titanium pad 160 explosive welded thereto. Such copper preform 155 and titanium pad 160 are supplied by Atlas Technologies, although other suppliers could also be used. Copper preform 155 is shaped to accommodate the interface to the copper conductors and the titanium heater element 55. The interface can be for example, a coined flat end for soldering or a pin integrated into an electrical connector. If desirable, the copper 155 can then be plated with metals and procedures in common use by the electronics industry for electrical contacts before attachment to the heater 55. Titanium pad 160 is shaped to nest with the heater connection area using a technique such as coining, as well. Titanium pad can be micro resistance welded to the titanium foil heater element to achieve the connection. The micro resistance weld only melts the titanium-to-titanium interface eliminating any intermetallic phases.

The above could be summarized as the mechanical interface transition having the copper containing component being a copper containing perform, and the titanium containing component being a titanium containing pad. The pad and perform are offset and welded together across an overlapping portion.

Transition regions 110, 130 and 150 are all coated with a polymeric compound to minimize stress and any likelihood of failure during operational conditions. Different compounds are used to encapsulate transition regions together with the extending foil heaters and connective wires, depending upon heater application. For example, if a surface mounted heater such as shown in FIG. 2 is to be laminated to a gas turbine component or a composite and contribute to the structural strength, a rigid encapsulation would be required. For a heater where a rigid connection region is desired a BMI molding compound such as those available from YLA, Inc. can be used. This molding compound is filled with electrically non-conductive fillers with various aspect ratios and can be injected around the electrical conductor 65 onto the surface of titanium foil heater element using the proper tool. The BMI compound offers many benefits in comparison to conventional thermoplastic connector materials such as Nylon™. For example, low injection pressure reduces the mechanical stress on the conductors from the polymer flow entering the tool. Additionally, low viscosity allows wetting and impregnation of the heater materials as required particularly when the heater element is supported by a woven fabric. Further, the resultant connector surface that can be bonded to during subsequent operations.

Alternatively, the surface mounted titanium foil heater with titanium weld can be encapsulated in a flexible perfluorocarbon molding compound such as for example Sifel™. This more flexible perfluorocarbon encapsulant is more applicable when the heater electrical isolator body is for example a perfluorocarbon elastomer. Perfluorocarbon molding compound Sifel™ is filled with electrically non-conductive fillers with various aspect ratios can be injected around the electrical conductors onto the surface of titanium foil heater element 55 using a tool commonly used for such purposes that affixes the conductors and seals to the heater surface creating the cavity to be filled. The perfluorocarbon compound has benefits in comparison to conventional thermoplastic connector materials such as Nylon™. The use of such perfluorocarbons can permit low injection pressure that reduces the mechanical stress on the conductors from the polymer flow entering the tool. Additionally, the connector surface that can be bonded to during subsequent operations.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the disclosure will include all embodiments falling within the scope of the appended claims.

I claim:

1. An electrical connection for a surface mounted heater for aerospace components comprising:
   a titanium containing heater element;
   a copper containing conductor transition for connection to an electrical connector;
   a mechanical interface transition connecting said titanium containing heater element and said copper containing conductor transition,
      wherein said mechanical interface transition has a titanium containing component and a copper containing component, said titanium containing component being welded to said titanium containing heater element forming a titanium containing transition.

2. The connection of claim 1, wherein said titanium containing heater element and said titanium containing transition are encapsulated in a polymeric material.

3. The connection of claim 2, wherein said polymeric material is a rigid material selected from the group consisting of epoxy, bimaleimide, polyamide, polyurethane, polyester and phthalonitrile.

4. The connection of claim 2, wherein said polymeric material is a flexible material selected from the group consisting of perfluorocarbon, fluorocarbon, silicone and polysulfide.

5. The connection of claim 1, wherein said mechanical interface transition includes one of said titanium containing component and said copper containing component being a wire, and the other jacketing said wire.

6. The connection of claim 1, wherein said titanium containing component abutting and being welded to the copper containing component, with said titanium containing component being a rod, and said copper containing component being a rod, and wherein said rods are welded to each other at an end of each of said rods.

7. The connection of claim 1, wherein said mechanical interface transition having said copper containing component being a copper containing preform, and said titanium containing component being a titanium containing pad, with said pad and said preform being offset, and welded together across an overlapping portion.

8. A heater connection for a surface mounted heater for a jet turbine application comprising:
   a titanium containing heater element;
   a copper containing conductor transition for connection to a power source; and
   a mechanical interface transition connecting heater element and said copper containing conductor transition,
      wherein said mechanical interface comprises a titanium containing weld, said titanium containing weld connected to said copper containing conductor transition.

9. The heater connection of claim 8, wherein said titanium containing heater element is a surface mounted heater element for a gas turbine engine.

10. The heater connection of claim 8, wherein said titanium containing heater element and said mechanical interface are encapsulated in a polymeric material.

11. The heater connection of claim 10, wherein polymeric material is a rigid material selected from the group consisting of epoxy, bismaleimide, polyamide, polyurethane, polyester and phthalonitrile.

12. The heater connection of claim 10, wherein said polymeric material is a flexible material selected from the group consisting of perfluorocarbon, fluorocarbon, silicone and polysulfide.

13. The heater connection of claim 8, wherein said mechanical interface transition includes one of said titanium containing component and said copper containing component being a wire, and the other jacketing said wire.

14. The heater connection of claim 8, wherein said titanium containing component abutting and being welded to the copper containing component, with said titanium containing component being a rod, and said copper containing component being a rod, and wherein said rods are welded to each other at an end of each of said rods.

15. The heater connection of claim 8, wherein said mechanical interface transition having said copper containing component being a copper perform, and said titanium containing component being a titanium pad, with said pad and said perform being offset, and welded together across an overlapping portion.

16. A heater connection for a surface mounted heater for a jet turbine component comprising:
 a heater element;
 a conductor transition connected to a power source;
 a transition connecting said heater element and said conductor transition,
  wherein said transition comprises a titanium containing weld; and
said heater element being a titanium or titanium alloy foil heater element, said titanium containing transition further comprises a titanium containing material connected to a copper containing conductor transition.

17. The heater connection of claim 16, wherein said titanium containing weld is a titanium weld or a titanium allow weld.

18. The heater connection of claim 16, wherein said titanium containing heater element is a surface mounted heater element for a gas turbine engine.

19. The heater connection of claim 16, wherein said titanium containing heater element, said copper containing conductor transition and said titanium containing transition are encapsulated in a polymeric material.

20. The heater connection of claim 19, wherein polymeric material is a rigid material selected from the group consisting of epoxy, bismaleimide, polyamide, polyurethane, polyester and phthalonitrile.

21. The heater connection of claim 16, wherein said mechanical interface transition includes one of said titanium containing component and said copper containing component being a wire, and the other jackening said wire.

22. The heater connection of claim 16, wherein said titanium containing component abutting and being welded to the copper containing component, with said titanium containing component being a titanium rod, and said copper containing component being a copper rod, and wherein said rods are welded to each other at an end of each of said rods.

23. The heater connection of claim 16, wherein said mechanical interface transition having said copper containing component being a copper perform, and said titanium containing component being a titanium pad, with said pad and said perform being offset, and welded together across an overlapping portion.

* * * * *